United States Patent [19]

Wright et al.

[11] Patent Number: 4,634,089
[45] Date of Patent: Jan. 6, 1987

[54] UNIVERSAL CUP HOLDER

[76] Inventors: William T. Wright, 2760 Ranch House Rd., Orlando, Fla. 32822; Edward J. Guard, 2480 McIntosh Way, Maitland, Fla. 32751

[21] Appl. No.: 723,916

[22] Filed: Apr. 16, 1985

[51] Int. Cl.$^4$ ............................................. A47K 1/08
[52] U.S. Cl. .............................. 248/311.2; 248/205.2; 248/310
[58] Field of Search ...................... 248/311.2, 312, 310, 248/312.1, 314, 205.2, 903, 127; 211/75, 88; D7/70

[56] References Cited

U.S. PATENT DOCUMENTS

| | | | |
|---|---|---|---|
| 1,474,077 | 11/1923 | Grundhand et al. | D7/70 X |
| 2,532,244 | 11/1950 | Pasmore | 248/311.2 X |
| 2,591,349 | 4/1952 | Goebel | 248/127 UX |
| 2,698,155 | 12/1954 | Bowman | D7/70 X |
| 2,754,078 | 7/1956 | Koger et al. | D7/70 X |
| 3,033,405 | 5/1962 | Adell | 248/311.2 X |
| 3,090,478 | 5/1963 | Stanley | 248/127 X |
| 3,415,300 | 12/1968 | Worcester | 248/205.2 X |
| 3,790,118 | 2/1974 | Warren et al. | 248/311.2 |

Primary Examiner—Ramon O. Ramirez
Attorney, Agent, or Firm—Julian C. Renfro

[57] ABSTRACT

A universal holder of the top loading type for accommodating and safely supporting a drink container of any of a wide variety of sizes and configurations, comprising a vertical backbone member that supports a pair of highly flexible, symmetrically configured arms each possessing substantial curvature. The two arms together form a generally circular configuration, with the tips of the arms being in general alignment, but not coming into contact with each other during normal use of the holder. The arms preferably are of non-constant cross section, possessing substantially smaller vertical dimension at their tips than adjacent the location of their attachment to the vertical backbone member. Importantly, the uppermost surfaces of the arms are flared somewhat outwardly to facilitate the downward insertion of a drink container therebetween, with the arms being sufficiently flexible as to accommodate drink containers of many different diameters. The arms clasp the drink container sufficiently tightly in each instance as to prevent dislodgment of the drink container from the holder, but not so tightly as to crush a drink container made from paper or foam plastic. Two external surfaces of the holder are substantially flat to accept one or more strips of Velcro to be utilized for mounting the holder to either a substantially horizontal, or to a substantially vertical surface.

26 Claims, 7 Drawing Figures

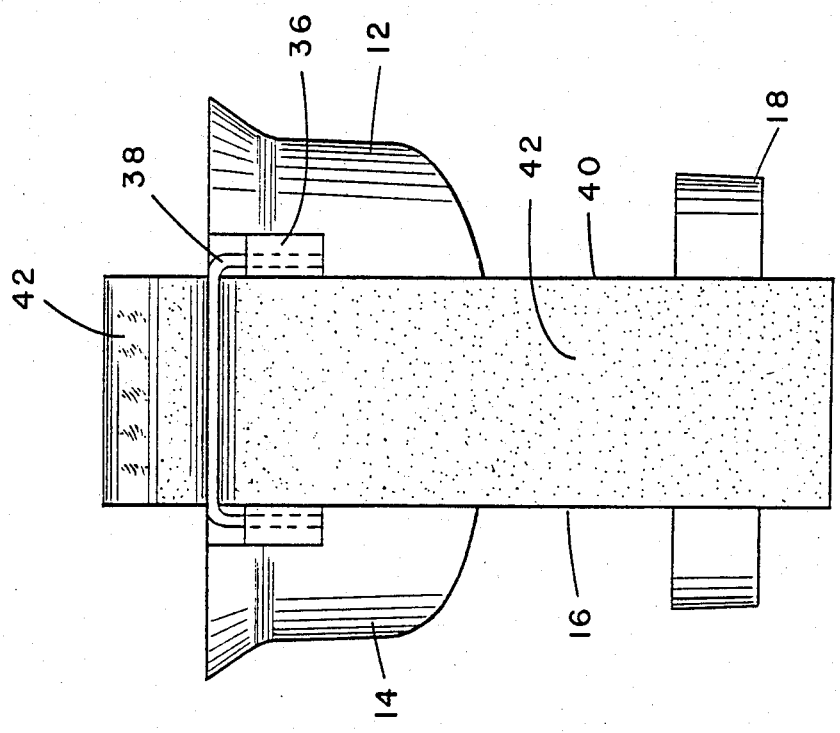
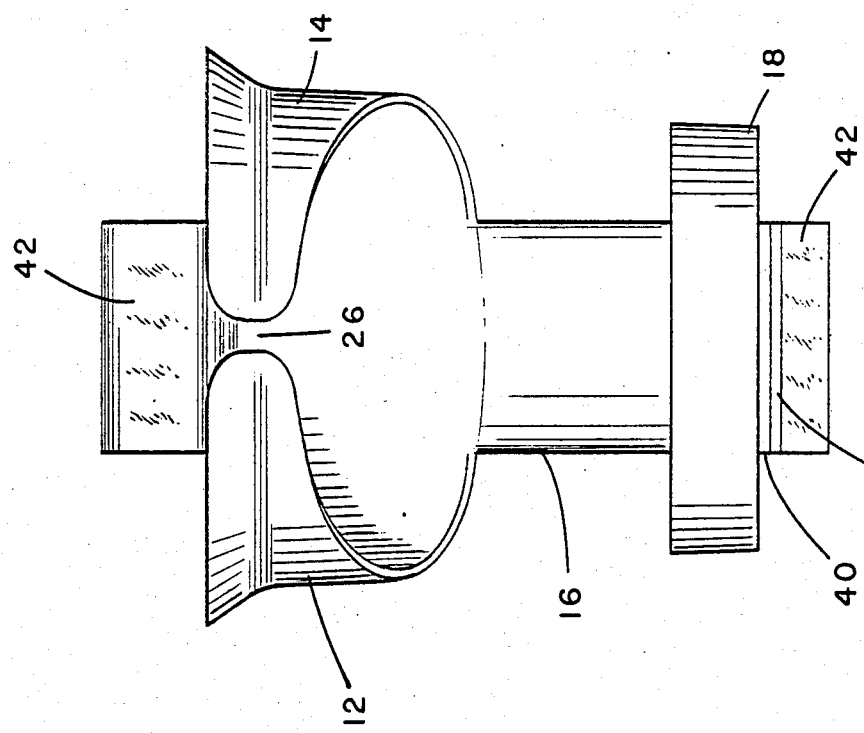

UNIVERSAL CUP HOLDER

BACKGROUND OF THE INVENTION

In the past, many have tried to design low cost holders primarily for use in vehicles, that may be supported from either horizontal or vertical surfaces, and that can serve to hold any of a variety of cup configurations, as well as canned and bottled drinks. To date, none of these cup holders has been satisfactory.

Probably the most widely used low cost cup holder to date has been a plastic device utilizing an unbroken ring some 2¾ inches in diameter that is located directly above a base member, with these being interconnected by a vertically disposed backbone member. The backbone member terminates in a hook that is located just above the ring shaped portion, such that the hook can engage the window slot in an automobile door. The base member is usually a flat disk some 1¾ inches in diameter, that serves to prevent a 12 ounce drink can placed inside the ring shaped portion from falling through, but which offers no lateral stability. Therefore, as the user drives down the road or parks in the car, this cup holder is intended to support the user's canned drink, small size bottle, or small size paper or plastic cup.

This well known cup holder has many serious disadvantages, including the tendency for the hook to become disengaged from the window slot as the drink is lifted, and for the device to fall off the door entirely should the door be moved, or should the car hit a bump while underway. Also, if a cup having tapered sides is placed inside the fixed ring, it tends to jam therein, making a two handed retrieval mandatory.

Probably the most serious disadvantage of this prior art cup holder has been the fact that it will receive only a very small variety of cups, properly supporting only one or two cup sizes, or else a canned drink. The use of any larger cup, can, or bottle size simply will not fit into the fixed ring of this very restrictive prior art design. As a matter of fact, the use of this earlier device entailed serious jeopardy to the clothing of the user as well as to the upholstery of the automobile. In addition, this prior art design would not receive a cup equipped with a handle, for the ring shaped member of this fixed size cup holder formed a closed circle that completely precluded a handle being on the cup.

It was in an effort to substantially improve upon this and other cup holders of the prior art that the present invention was created.

SUMMARY OF THE INVENTION

A universal holder for safely supporting a drink container in accordance with this invention will accommodate a wide variety of plastic or paper cup sizes and configurations, as well as cans, mugs, bottles, cartons, tea and coffee cups and the like. Our cup holder comprises a base member supporting adjacent one edge thereof, a vertical backbone member, with the vertical backbone member in turn supporting a pair of curved, highly flexible, symmetrically configured arms extending over the base member and vertically spaced therefrom.

The arms each possess substantial curvature, and together form a generally circular configuration, with the tips of the arms being in general alignment, but not coming into contact with each other during normal use of the holder.

The arms of our novel cup holder are preferably of non-constant cross section, and we prefer for the arms to have substantially smaller vertical dimension at their tips than adjacent the location of the attachment point of the arms to the vertical backbone member. Importantly, the uppermost surfaces of the arms flare somewhat outwardly, so that when the base of a cup, can or bottle is pressed down upon these surfaces, the arms will be caused to move apart so as to admit first the bottom of the cup, can or bottle, and thereafter the entire drinking device. The flared guide lip thus provided also imparts the proper amount of stiffness required for the split ring to safely hold large and heavily loaded drink containers. Because of the type of construction and configuration we use, and the way our cup holder is employed, we call our novel cup holder a "top entry" type device, which is to be distinguished from the various types of split ring holders that receive shower heads and the like that are inserted laterally into split ring holders, that is, from the side.

Although cans are of constant diameter, many cups have tapered sides, with the opening at the top of the cup typically being of substantially larger diameter than the base. Therefore, when endeavoring to insert a cup of large capacity into our cup holder, after having inserted the bottom of the cup between the curved arms, the bottom of the cup continues downward until it makes contact with the base member of our cup holder. During this procedure, the highly flexible arms of our cup holder will move apart to an extent such that even a 44 ounce "Super Big Gulp" cup can be accommodated without the risk of the cup and its contents suddenly being dumped in the lap of the user.

Our expandable top loading split ring cup holder can be securely anchored to a horizontal or to a vertical surface, such as by the use of adhesive backed Velcro or the like, so that when the user desires to drink from the cup, he or she merely grasps the sides of the cup, lifting it upwardly until such time as the arms have released the cup. Then, when it is desired to replace the cup in the cup holder, it is merely necessary to press the base of the cup against the tapered upper surfaces of the arms in order to cause them to move apart, such that the drink can then be moved downwardly into the secure position in which the bottom of the cup engages the base member of our cup holder.

A safety plus for our new cup holder configuration is that it advantageously embodies a configuration and utilization whereby a drink container can be inserted or removed with a one hand motion while driving or eating. This is made possible by the positive grip of the adhesive backed Velcro or adhesive backed tape to the mounting surface, for by virtue of this highly effective mounting arrangement, the other hand is not needed to steady the holder while inserting or extracting the drink container. This is in stark comparison with the drink holders of the prior art, which usually required the other hand to steady the holder while removing or inserting a can or cup, especially when the cup had tapered sidewalls. This is because a cup of tapered configuration would tend to bind rather tightly in the fixed diameter prior art cup holders, thus almost always requiring the user to use two hands when attempting to remove the cup from the holder. As is obvious, this arrangement amounted to a serious distraction in the event a driver was endeavoring to sip his or her drink while driving.

The base member at the bottom of our novel cup holder preferably has an upstanding rim member whose diameter is such that many cup sizes, as well as the bases of most cans and bottles will fit therein. However, in the case of larger cup sizes, such as the 32 ounce and the 44 ounce cups, the bottom of the cup actually encircles the rim member instead of fitting inside. Although in this latter instance, the base member of our device cannot serve to catch any condensate dripping off the sides of the cup, the base member nevertheless serves as a stabilizing means for the bottom of the cup, such that the cup will not be displaced should even the car door be opened, and then reclosed. Holders in accordance with the prior art only had a flat platform to support the base of the cup, bottle or can, which quite clearly did not provide either for lateral stabilization or condensation collection.

Although we are not to be limited to any particular plastic, we prefer for our holder to be an injection molded, flexible, crack resistant plastic such as polyethylene or polypropylene.

It is therefore a principal object of our invention to provide a universal cup holder of highly functional and advantageous design that can be produced inexpensively, and that will safely hold cups of a wide size range, as well as cans, bottles and cartons, and even accommodate cups and mugs equipped with a handle.

It is another object of our invention to provide a universal drink container holder that will accommodate any size standard drink container between the ten ounce lily cup, up to the 44 ounce supersize now becoming popular.

It is still another object of our invention to provide a drink container holder that can be removably secured to a convenient vertical or horizontal mounting portion or surface of the automobile interior adjacent the driver, with the configuration of our holder being self-aligning such that the driver can by the use of one hand, either remove a drink container from, or insert a drink container into, the holder without removing his or her eyes from the road, thus amounting to a distinct safety measure.

It is yet another object of our invention to provide a drink holder utilizing a beveled flared lip representing an integral part of the split flexible ring used to support the drink, with the flared lip aiding in the centering and insertion of a drink container, and also serving to stiffen the arms of the flexible ring such that they will safely hold even the heaviest drink container throughout all movements of an automobile door.

These and other objects, features and advantages will be more apparent from the enclosed drawings.

BRIEF DESCRIPTION OF THE DRAWINGS

FIG. 2 is a front elevational view of the cup holder, with this view showing the chamfered arm tips, the slight angle of the sides of the arms to the vertical, and the preferred configuration of the stabilizing base member;

FIG. 3 is a rear view, showing the adhesive side of the Velcro portion that would be affixed to a suitable vertical member, such as to the window trim member of an automobile door, with it being understood that the hook and loop Velcro portions are in interfitting relation at this point;

DETAILED DESCRIPTION

Figure 1:
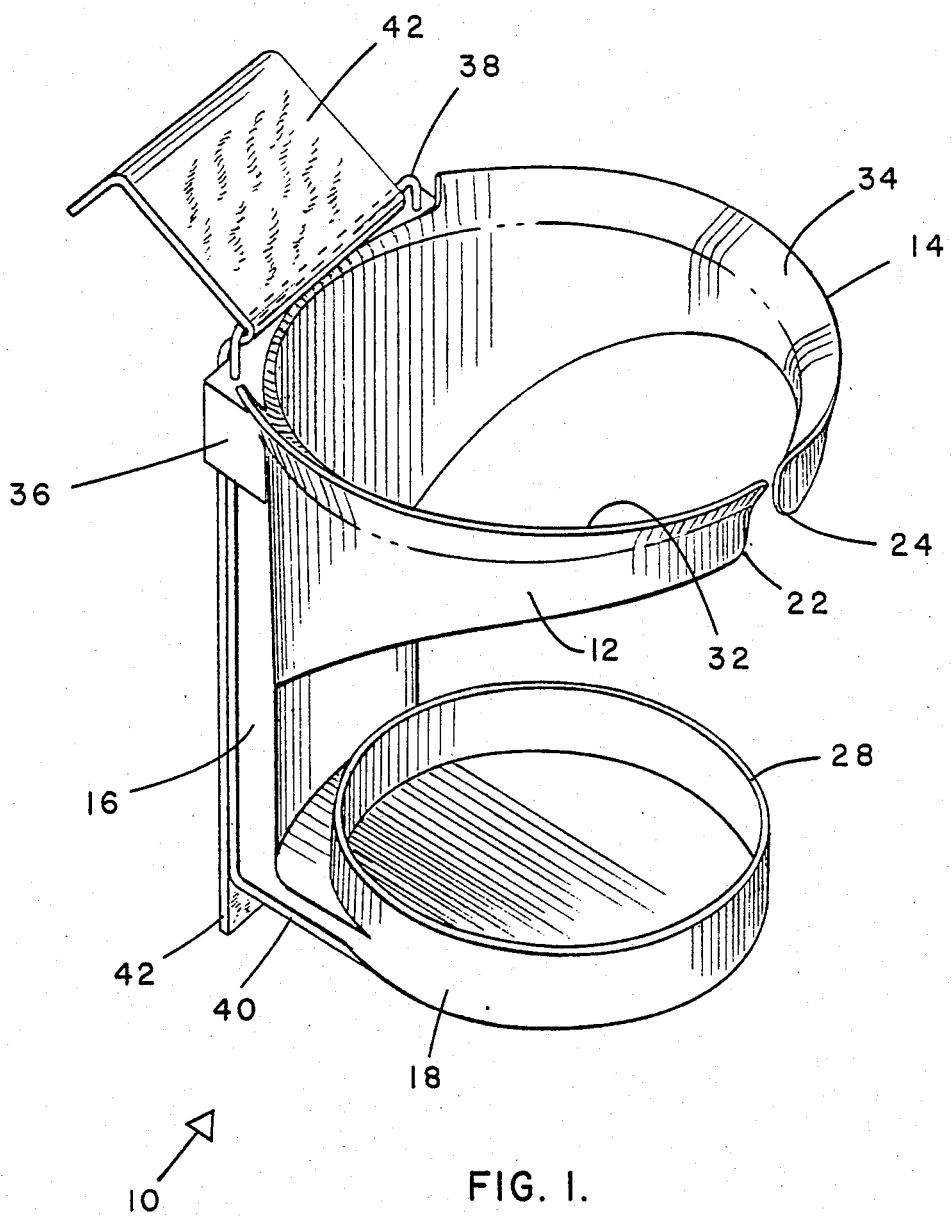
FIG. 1 is a perspective view showing the general configuration of the universal cup holder in accordance with this invention, with the pair of flexible, generally circular arms being clearly visible, which arms have an upwardly and outwardly flared configuration to permit the ready alignment of a cup that is to be inserted downwardly between the arms.

Turning to FIG. 1, it will there be seen that we have illustrated a universal cup holder 10 in accordance with this invention, involving a pair of symmetrically configured arms 12 and 14 supported from a vertical backbone member 16. The backbone member is in turn attached to a base member 18, which has an upstanding rim 28. As will be seen in more detail hereinafter, our cup holder may be supported either by the base member 18 resting on a horizontal surface, or by the rear side of the vertical backbone member 16 being directly attached to a vertical surface, such as to a car window frame, wall, or the like. Velcro is the preferred means for securing the bottom or the side member of our cup holder to the supporting surface, as will be afterward discussed, although some types of double-sided tape may be used.

The arms 12 and 14 possess substantial curvature, and together form a generally circular configuration that is located above the base member 18. The tips 22 and 24 of the arms 12 and 14 are rounded on their upper and lower edges, and generally reside in alignment, as best seen in FIG. 2, but do not come into contact with each other during normal use of the cup holder. Because of the space 26 normally existing between the tips 22 and 24 of the arms, a cup equipped with a handle can be readily supported by the arms 12 and 14, for the handle of the cup, such as even a mug or teacup, can reside in the space 26, while the body of the cup is being gripped by the arms 12 and 14, and usually supported to some extent by the base 18. Because the tips 22 and 24 are chamfered top and bottom, easy insertion and extraction of a wide variety of cans, bottles, cartons, and cups, even cups or mugs with handles, is readily possible.

Inasmuch as it is a principal goal of our cup holder to be able to safely accommodate a wide range of cup sizes, typically paper or plastic cups having tapered sides, we have designed the arms 12 and 14 to be strong yet highly flexible. Since the larger cup sizes have correspondingly larger base diameters, we have designed the upper circumferential portions of the arms to flare outwardly, or in other words to have inwardly curved or chamfered inner edges. The preferred configuration is best seen in FIGS. 1, 2, 4 and 5. These figures are all constructed at approximately full size.

Thus it is seen that the effective inner diameter of the arms is larger at the top than at the bottom. As a consequence of this advantageous design, upon the base of a cup being pressed down against the upper inner portions 32 and 34 of the arms 12 and 14, the arms are caused to spread, so as to initially accommodate the base portion of the cup. Then, as the user continues to press the cup downwardly, more expansion of the arms follows, with more acceptance of the cup ensuing, until the cup has moved down sufficiently far that the outward spread of the arms permits the bottom of the cup to come into contact with the upstanding rim 28 of base member 18. At this point, the cup is held quite securely against displacement by the tightly gripping arms 12 and 14, even though the space 26 between the tips 22 and 24 has enlarged to some extent. Our arms can spread to accommodate a cup diameter of up to at least four inches.

In many instances the base member 18 serves an important lateral stabilization function, but this is not the case when a large base mug 50 with handle is held, for in that instance the base member serves only the function of preventing the mug from falling through the arms. It is important to note that a flared lip cup, or other such container, could be supported solely by the extensible arms 12 and 14.

It is to be noted that the arms 12 and 14 are preferably of non-constant cross section. As revealed in FIGS. 1, 2 and 4, the arms possess substantially smaller vertical dimension at their tips than adjacent the location of the attachment point of the arms to the vertical backbone member 16. As a result of the tapered arm configuration, the arms are capable of providing a positive gripping force around a cup inserted therebetween, but not so much force as to crush a paper or foam container. Also quite importantly, the considerable amount of arm height (arm cross-section) we prefer to use at the location where the arms joint to the vertical backbone member 16 serves to minimize downward bending of the arms at the time of insertion of a drink container, as well as to minimize upward bending when extracting the container. Our advantageous construction tends to transfer these upward and downward loads evenly to the backbone member at the time the user forces the base of the cup downwardly against the outwardly flared top portions 32 and 34 of the arms 12 and 14. The variation in vertical dimension of the arms from their attachment point to their tips is preferably in a ratio of approximately 3.125 to 1, although quite clearly, we are not to be limited to this.

In addition to the above, it is to be realized that the arms 12 and 14 taper slightly inward as viewed in FIGS. 2 and 3, from a point just below the outwardly flared top portions, to the lowermost edges of the arms 12 and 14. The amount of such inward taper (or conical taper) is very small, on the order of 2°, which is barely discernable in these two figures of drawing. A similar amount of inward taper is associated with the upstanding rim 28 utilized on the base 18, meaning that the lower diameter of member 28 is very slightly smaller than the upper diameter. Rather than providing a structural advantage, this inward taper of the rim member and the sides of the arms is of benefit in certain molding procedures to which we may resort in the manufacture of our novel universal cup holder.

Figure 4:
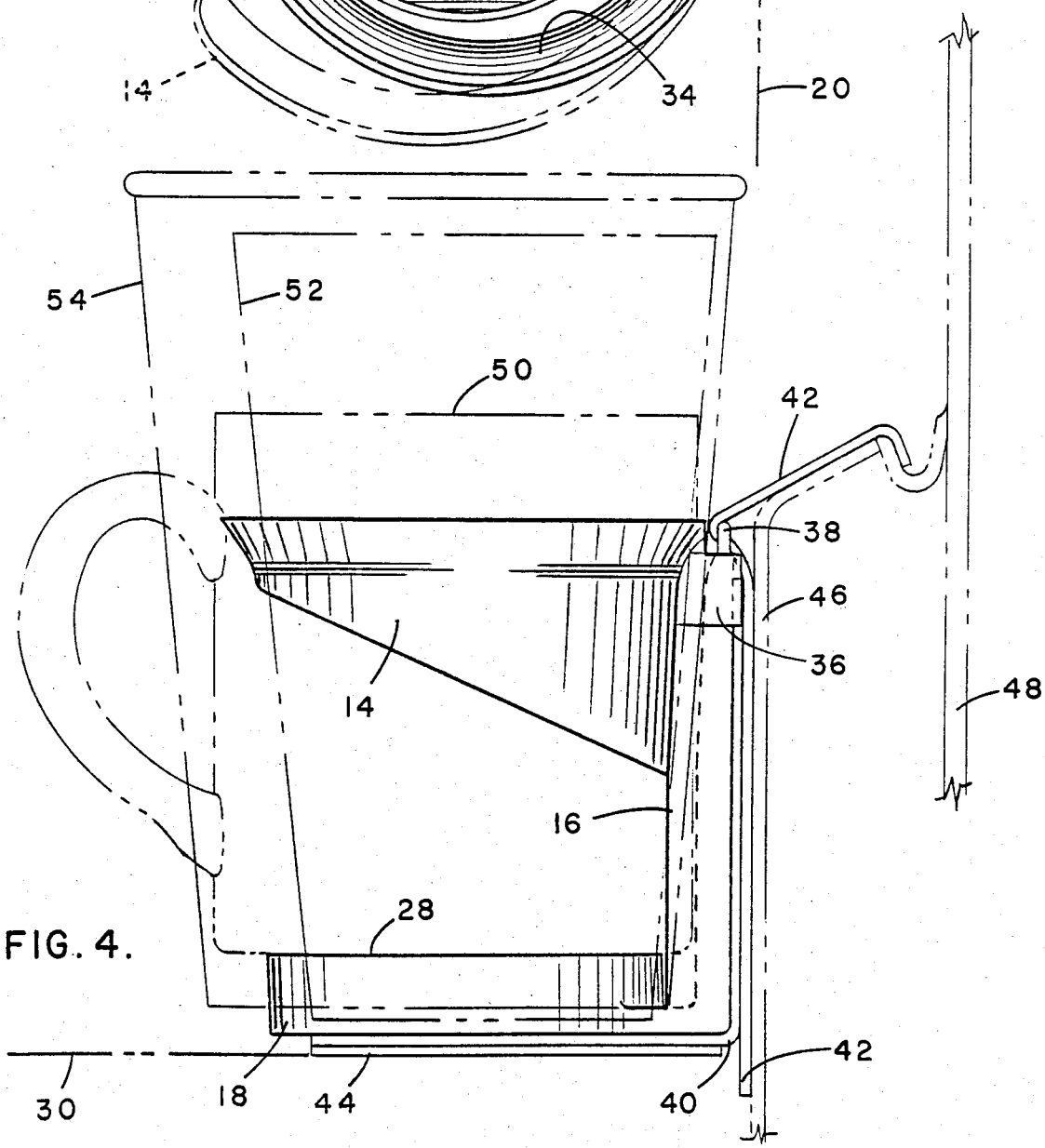
FIG. 4 is a side elevational view, showing by the use of several sets of phantom lines, how cups of a variety of sizes and configurations can be readily accommodated in our universal cup holder, and also showing the Velcro portions that serve to hold the cup holder securely against a vertically disposed mounting surface.

With particular reference to the base member 18, it is to be noted in FIG. 1 that it preferably is equipped with encircling rim 28, thereby serving as a drip receptacle when a small to meduim size cup, can or bottle is supported by the arms 12 and 14, with the lowermost portion of the cup or other drinking container resting inside the upstanding rim 28; note FIGS. 1 and 4.

Figure 5:
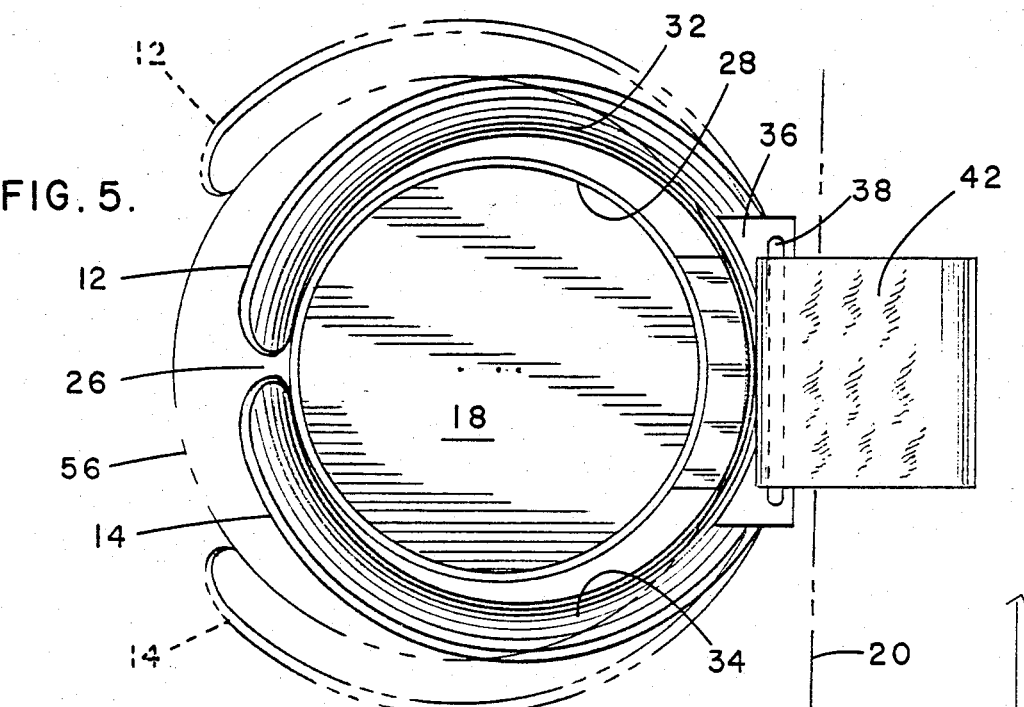
FIG. 5 is a top view of our cup holder, showing the relationship of the base member to the arms at rest, also showing the extent to which the arms can move apart in order to receive a large size cup, and further showing a portion of the means used to anchor the cup holder to a mounting surface.

It is important to note in FIGS. 1 and 5 that the portion of the rim 28 closest to the backbone member 16 is spaced from the backbone member, for a reason soon to become apparent. The interior portion of the backbone member 16 is "cupped", or in other words, possesses substantial curvature, as is to be noted in FIG. 1.

Also visible in FIGS. 1, 4 and 5 is upper reinforced shoulder 36, representing the upper terminus of the vertical spine or backbone member 16. Two small, laterally spaced, vertically disposed holes are provided in the shoulder member 36, which receive the arms of a U-shaped pin member 38, with member 38 serving to help prevent the Velcro on the backside of the vertical backbone member from peeling away from the Velcro on the vertically disposed mounting surface when our cup holder is in use. This will be discussed to a greater extent hereinafter.

In FIG. 3 we have illustrated the sticky or adhesive side of the Velcro piece 42, with the uppermost part of the piece or portion 42 extending upwardly into the approximate position in which it will reside when it has adhered to a door or window trim. It is to be noted that the top tab of the Velcro portion, being flexible tape, can adhere to any of a wide variety of shapes, such as found on a car door interior trim.

It is important to observe in FIG. 4 that a wide range of drinking devices can be successfully accommodated in our novel cup holder. Not only will it properly receive the usual 12 ounce soft drink can, but also, as shown by phantom lines 50, it can receive a cup or mug equipped with a handle. This of course is possible because of the fact that the arms are separate, with a space 26 normally existing between the tips of the arms, as shown in FIGS. 2 and 5, and it is this space in which the cup handle resides. In the case of flat bottomed cups or mugs, their base typically sits upon the upper edge of the ring-shaped base member 28.

FIG. 4 also reveals that a standard, medium size paper or plastic drinking cup with tapered sides can be readily accommodated, with the base of such cup being received inside the upstanding ring shaped base member 28. Phantom lines at 52 reveal such a cup, which may hold 16 ounces, for example. As is obvious, any drippage from a cup of this size, from a bottle, or from a 12 ounce beverage can will be caught and retained in the base member 18, which is surrounded by the upstanding rim member 28.

Continuing with FIG. 4, it is to be realized in the case of several large cups, including the 32 ounce cup, the largest size standard drinking cup accommodating 44 fluid ounces, and certain sizes in between, the bottom of the cup is recessed away from the lower rim, with the lower cup rim straddling and surrounding the upstanding ring-shaped base member 28 of our cup holder. Thus, our base member 18 effectively prevents undesired lateral displacement of a very wide variety of cups, including this largest standard cup. The phantom lines at 54 show a cup that may hold between 30 and 36 ounces, with it to be understood that such a cup has the same diameter, at the location contacted by the inner surfaces of the arms 12 and 14, as does the 44 ounce "Super Big Gulp" cup.

FIG. 4 further reveals the arrangement by which we preferably mount our universal cup holder to a vertically disposed mounting surface, such as to a door trim. The outer part, or rearwardly facing portion of the vertical backbone member 16, best seen in FIG. 3, was preferably equipped with Velcro, usually a piece or strip of hook type Velcro 40 attached at the time of manufacture, which extends from the upper reinforced shoulder 36, down the outside of the vertical backbone member, and then across under the base member 18. This Velcro strip or portion 40 is preferably affixed to the cup holder by a suitable adhesive or cement.

After the user has selected the surface to which the cup holder is to be attached, he or she utilizes a strip 42 of the opposite type of Velcro, which of course is a loop type Velcro in the assumed instance, which is first attached by adhesive to the upper portion of the mounting surface 46. As should be clear, the mounting surface may of course by a portion of the window trim or the door trim of an automobile, although we quite obviously are not to be limited to this. In FIG. 4, the window of the automobile is indicated at 48. Instead of this loop type Velcro then being extended directly down alongside the door or window trim, it is first inserted through the U-shaped pin 38 mounted in the upper reinforced shoulder 36 of the cup holder. Thereafter, the Velcro is pulled tightly downwardly, and caused to adhere to the trim member 46, so that the adhesive on the backside of the piece or strip 42 will cause this loop type Velcro strip to tightly adhere to this trim member.

It is to be realized that the U-shaped pin 38 serves the important function of preventing the Velcro strip 40 on the vertical member 16 of the cup holder from pulling away from the strip 42 of loop type Velcro mounted on the door trim, for although Velcro has relatively weak peel strength, it has considerable strength in shear, and the U-shaped pin member 38 prevents the two pieces of Velcro from pulling or peeling apart. In the typical instance, the top, flexible part of the Velcro strip 42 is adjusted and attached preferably at an angle such as to the top of the door trim; see FIG. 4. This places the flexible part of the Velcro in shear, and in line to prevent pull away peel from the top of the trim member.

The same or a separate piece of hook type Velcro is mounted upon the bottom of the cup holder, so that if instead of mounting the cup holder on a vertical surface, it is desired to mount the cup holder on a horizontal surface, this can be readily accommodated by the appropriate securing of a piece 44 of loop type Velcro on the dashboard, sill, or other horizontal mounting surface.

With reference now to FIGS. 4 and 5, it is to be seen how the loop type Velcro 42 interacts with the U-shaped pin 38 to form an effective restraint against the cup holder pulling away from the vertical surface at the location where the two types of Velcro, the hook and loop types, interfit. The vertical reference mounting plane is shown at 20 in FIG. 5.

As previously mentioned, the U-shapd pin 38 has lower legs that fit into appropriately sized holes provided in the reinforcing shoulder 36. Therefore, the forces tending to pull the cup holder away from the vertical mounting surfaces, such as during the cup insertion procedure, are effectively resolved by the use of the U-shaped pin 38. It is to be realized that the Velcro used in accordance with this invention can be of a tasteful color, so as to blend with the color scheme of the automobile interior, for example. The colors could be closely matched, or the colors could be coordinated, using for example orange colored Velcro with a gray colored cup holder.

It is also to be noted that the upstanding ring member 28 of the base member 18 illustrated in FIG. 5 bears definite size and placement relationships to the curved arms 12 and 14. On the one hand, when utilizing a soft drink can or bottle, the base of the can or bottle typically resides inside the upstanding ring 28 of the base member 18, giving stability to the drink container as well as serving as a drip collector.

On the other hand, when one of the larger size drink containers is placed inside the cup holder, the curved arms move apart, as shown in phantom lines 56 in FIG. 5, to what may be regarded as the approximate diameter of maximum arm spread.

As should now be clear, when one of these large cups, containing from 30 to 44 ounces, have been pushed down in the holder, the lower rim around the base of such cup entirely surrounds the upstanding ring 28 of the base member. It is important to note that because of the appropriate placement of the base member 18 and its rim 28, the ring or rim 28 is central to the arms when they are in their extended positions, so that these very large drink container sizes will be effectively held. It is because of this appropriate placement of the base member to cover the large cup situation that the ring member 28 is somewhat non-symmetrically placed with respect to the arms when the arms are in their non-extended positions. Note FIG. 5.

It should be clear in FIG. 4 that the arms 12 and 14 have been so designed as to snugly fit with little or no flexing by the insertion of a medium size cup into our novel cup holder, and by way of example, this cup may be of a size to hold 16 ounces. Note phantom lines 52, as previously mentioned. On the other hand, in FIG. 5, the arms 12 and 14 as shown in phantom lines 56 have spread apart much further, and the cup in this instance can be of the 30 to 36 ounce size, or even of the 44 ounce size. The phantom lines 56 are in effect a diameter representing the dimension of the largest cup our universal cup holder will accept, considering that this is the diameter of the cup at the location contacted by the inner surfaces of the arms 12 and 14. Such arm location is of course just below the outwardly flared upper portions of the arms.

On the other extreme, our cup holder can be used quite well with many sizes of smaller cups.

It should be quite apparent that the upstanding rim member 28 of the base member 18 serves a stabilizing function in addition to a support function, for whether the bottom rim of the cup fits inside the rim or ring member 28, or surrounds it, undesired lateral displacement of the bottom of the cup with respect to the cup holder is effectively prevented. For example, if our cup holder is mounted on the window frame of an automobile door, the cup will be safely held by our cup holder, should the door be opened, and even thereafter slammed shut.

It should now be apparent that all upward and downward loads exerted by the cup holder are reacted in shear by the adhesive backed Velcro, which permits the cup or other drink container to be quite heavily loaded with a beverage without spillage being risked. This result is of course achieved by virtue of the utilization of our novel U-shaped pin or member 38, as previously mentioned. As the user proceeds to remove the cup from the cup holder, the gripping force of the arms 12 and 14 must be overcome, and the interaction of the Velcro portions 40 and 42 effectively serve to prevent undesired displacement of the cup holder from the window frame or other such location as a result of either the downward force of the cup during insertion, or the upward force associated with disengagement. Importantly, the drink container can be removed from the cup holder, or replaced therein, without it being necessary at any phase of the operation for the user's other hand to be used in steadying the holder. This clearly was not possible when using the prior art cup holder, as was described hereinbefore.

Visible in FIG. 4 is the placement of a piece or strip 42 of Velcro (or double backed adhesive tape) on the underside of the base member 18, secured thereto by the use of adhesive or the like, so that the cup holder can be effectively mounted, for example, upon a complimentary piece of Velcro 44 attached to a horizontal reference mounting plane or surface 30, such as to the dashboard of a automobile, boat or other vehicle. However, we obviously are not to be limited to these mentioned options, for our novel cup holder could be mounted upon most horizontal or vertical surfaces.

We are not to be limited to the use of any particular material in the construction of our novel "top loading" cup holder, for our highly advantageous design is sufficiently basic that a comparatively wide range of flexible materials may be used. While plastics are favored, it is obvious that our universal cup holder could be assembled from metal with spring-like arms, or various types of plastics or hard rubbers, but the material most favored is thermoform type plastics, due to their low cost and excellent adaptability to many types of production methods, including high speed automatic injection molding processes.

Figure 6:
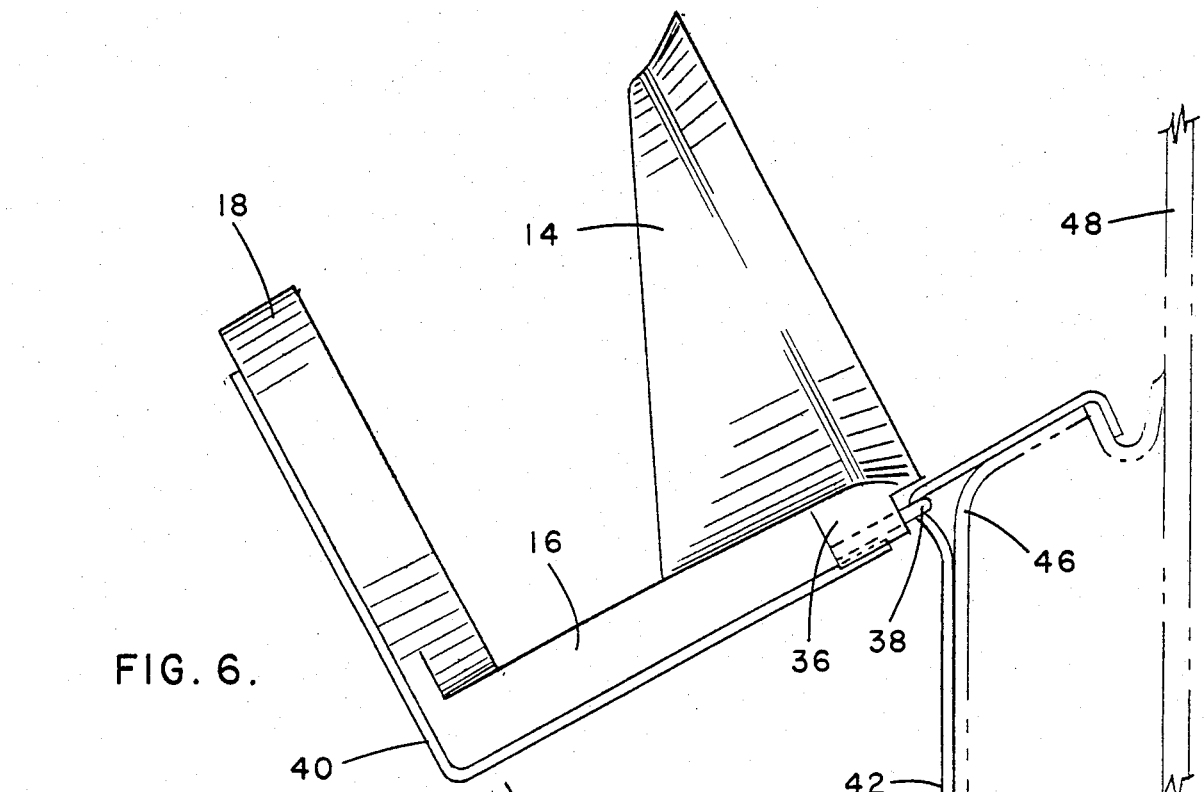
FIG. 6 is a view generally similar to FIG. 4, but showing how the Velcro on the vertical backbone can be easily separated from the Velcro on the mounting surface when the cup holder is to be removed for cleaning.
Figure 7:
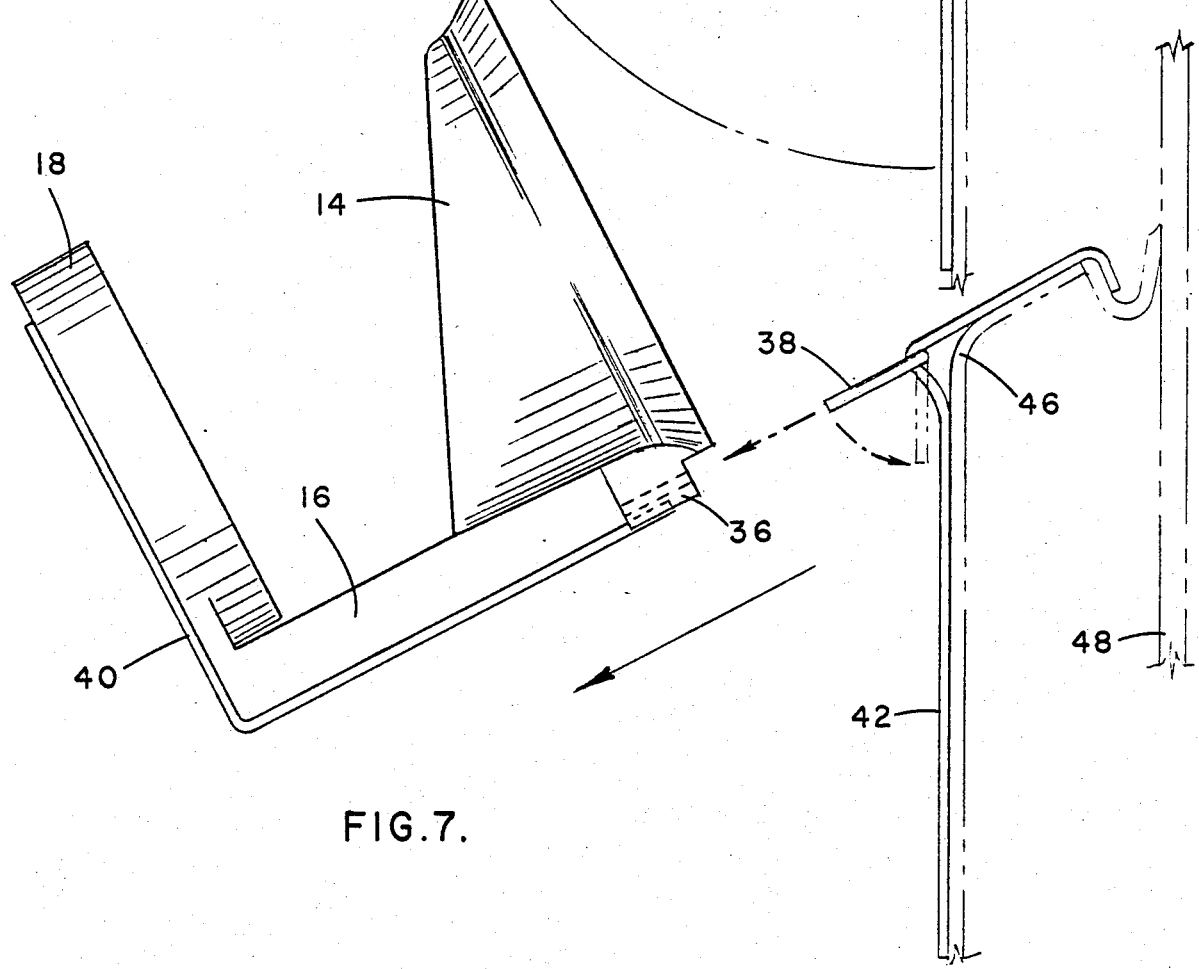
FIG. 7 is closely related to FIG. 6, but showing how the cup holder is pulled away from the U-shaped mounting pin to complete the removal procedure.

Turning to FIGS. 6 and 7, it is obvious that in FIG. 6 the user has pulled the Velcro 40 of the backbone member away from the Velcro 42 that adheres to the vertical mounting surface. This can be accomplished with relative ease, for as pointed out hereinbefore, Velcro has relatively low peel strength. During the pulling away procedure, the user may wish to anchor the base or lowest portion of the Velcro strip 42 to the vertical mounting surfaces 46 with his or her finger, so that it will not inadvertently be peeled away from such mounting surface.

After the cup holder has reached the position illustrated in FIG. 6, the user then pulls downwardly and outwardly, so as to cause the two legs of the U-shaped pin 38 to pull out of their holes located in the reinforced shoulder member 36. We have found that it is not necessary to utilize any form of cement or the like to hold the legs of the U-shaped pin in their respective holes in the shoulder member. This is because the role the U-shaped pin 38 plays in preventing the peeling away of the Velcro of the cup holder from the Velcro of the door trim is in a direction substantially perpendicular to the legs of the U-shaped pin, as is made clear by an inspection of FIG. 4. Therefore, because Velcro has ample strength in shear, there is little if any tendency of the legs of the U-shaped pin to pull out of their mounting holes, even when the user is pushing a cup downwardly into the arms 12 and 14, or when our top loading cup holder is supporting a heavily laden cup or other such component.

Although we are not to be limited to any specific thickness, heights, or other dimensions, nor to any particular materials used in the construction of our novel cup holders, the following are dimensions of one particular preferred embodiment:

At rest diameter of the arms: Approx. 3 1/16"
Fully expanded diameter of the arms: Slightly greater than 4 inches
Height of arms at joinder to vertical backbone member: 1 3/4"
Height of arms just inward from rounded tips: 9/16"
Average thickness of arms: 1/16"
Typical diameter of upstanding ring 28: 2 13/16"
Typical depth of upstanding ring 28: 9/16"
Typical distance of ring 28 below upper surfaces of arms: 3 1/16"
Typical thickness of backbone member: 1/4"
Size of U-shaped member 38
  Width 1 3/4"
  Height 3/4"
  Diameter 0.060"
Typical length of Velcro members:
  two 6" members,
  one 3" member
  all 1 1/2" wide

We claim:

1. A universal holder of the top loading type for accommodating and safely supporting a drink container of any of a wide variety of sizes and configurations, comprising a vertical backbone member, one side of said backbone member supporting a pair of curved, highly flexible, symmetrically configured arms each possessing substantial curvature, and the other side of said backbone member being substantially flat to accept mounting material to be utilized for mounting said holder upon a vertical mounting surface, said arms being of non-constant cross-section and together forming a generally circular configuration, said cross-section gradually decreasing in the direction of the tips of said arms, with the tips of said arms being in general alignment, but not coming into contact with each other during normal use of said holder, the upper surfaces of said arms being flared upwardly and outwardly for facilitating a one-handed downward insertion of a drink container therebetween, and for clasping the drink container very securely, said arms being sufficiently flexible as to be able to expand to accommodate drink containers of many different diameters, yet holding the drink container sufficiently securely as to prevent dislodgment of the drink container from said holder.

2. The universal holder as defined in claim 1 wherein said arms vary in their vertical dimension in a substantially uniform manner, with such variation in vertical dimension of said arms from their attachment point to their tips being in a ratio of approximately 3.125 to 1.

3. The universal holder as defined in claim 1 wherein said holder has a bottom surface and the bottom surface of said holder is substantially flat to accept a strip of mounting material to be utilized for mounting said holder to a substantially horizontal surface.

4. A universal holder of the top loading type for accommodating and safely supporting a drink container of any of a wide variety of sizes and configurations, comprising a vertical backbone member, said backbone member supporting a pair of curved, highly flexible, symmetrically configured arms each possessing substantial curvature, and together forming a generally circular configuration, with the tips of said arms being in general alignment, but not coming into contact with each other during normal use of said holder, said arms being of non-constant cross-section, said cross section gradually decreasing in the direction of the tips of said arms so that said arms possess a substantially smaller vertical dimension at their tips than adjacent the location of the attachment point of said arms to said vertical backbone member, with the uppermost surfaces of said arms being flared somewhat outwardly to facilitate the downward insertion of a drink container therebetween, and serving to clasp the drink container very securely, said arms being sufficiently flexible as to accommodate drink containers of many different diameters, and up to a diameter of approximately four inches, with said arms clasping the drink container sufficiently tightly in each instance as to prevent dislodgment of the drink container from the holder.

5. The universal holder as defined in claim 4 wherein the variation of vertical dimension of said arms from their attachment point to their tips is in a ratio of approximately 3.125 to 1.

6. The universal holder as defined in claim 4 wherein said holder has a bottom surface, said bottom surface being substantially flat to accept a strip of Velcro to be utilized for mounting said holder to a substantially horizontal surface.

7. The universal holder as defined in claim 4 wherein a base member is utilized for stabilization at the lower end of said vertical backbone member, said base member having an upwardly extending circular rim extending for 360° around said base member, inside which circular rim, the bottoms of small cups reside, and around which circular rim, the bottoms of large cups may reside.

8. The universal holder as defined in claim 4 wherein the outward part of said backbone member is straight to accommodate a support arrangement for the holder utilizing a system of adhesive backed tapes.

9. The universal holder as defined in claim 4 wherein the outward part of said backbone member is straight to accommodate a support arrangement for the holder utilizing a system of Velcro members.

10. The universal holder as defined in claim 4 wherein said holder is made of a thermoform type plastic.

11. The universal holder as defined in claim 4 wherein the arms of said holder are of constant thickness.

12. The universal holder as defined in claim 4 wherein said tips of said arms have chamfers top and bottom to facilitate easy insertion and extraction of cups having handles of various configuration.

13. A universal holder of the top loading type for accommodating and safely supporting a drink container of any of a wide variety of sizes and configurations, comprising a base member supporting adjacent one edge thereof, a vertical backbone member, said backbone member in turn supporting a pair of curved, highly flexible, symmetrically configured arms extending over said base member and vertically spaced therefrom, said arms each possessing substantial curvature, and together forming a generally circular configuration, with the tips of said arms being in general alignment, but not coming into contact with each other during normal use of said holder, said arms being of non-constant cross-section, said cross-section gradually decreasing in the direction of the tip of said arms so that said arms possess a substantially smaller vertical dimension at their tips than adjacent the location of the attachment point of said arms to said vertical backbone member, with the uppermost surfaces of said arms being flared somewhat outwardly to facilitate the downward insertion of a drink container therebetween, and the clasping of the drink container very securely, said arms being sufficiently flexible as to accommodate drink containers of many different diameters, and up to a diameter of approximately four inches, with the bottom of the drink container in most instances resting on said base, said arms clasping the drink container sufficiently securely in each instance as to prevent dislodgment of the drink container from the holder.

14. The universal holder as defined in claim 13 wherein the variation of vertical dimension of said arms from their attachment point to their tips is in a ratio of approximately 3.125 to 1.

15. The universal holder as defined in claim 13 wherein said base member has an upwardly extending circular rim extending 360° around said base member, inside which circular rim, the bottoms of small cups reside, and around which circular rim, the bottoms of large cups reside.

16. The universal holder as defined in claim 13 wherein the outward part of backbone is straight to accommodate a support arrangement for the holder utilizing a system of adhesive backed tapes.

17. The universal holder as recited in claim 13 wherein Velcro is used in the support of said holder from a vertical surface, and wherein a reinforced shoulder member is used at the upper end of said vertical backbone member, into which a U-shaped member is mounted, and through which U-shaped member a strip of Velcro concerned with the support of said holder may pass.

18. The universal holder as defined in claim 13 wherein the holder is made of a thermoform type plastic.

19. The universal holder as defined in claim 13 wherein the arms of said holder are of constant thickness.

20. The universal holder as defined in claim 13 wherein the arms of said holder are of graduated thickness to adjust for gripping strength.

21. The universal holder as defined in claim 13 wherein said tips of said arms have chamfers top and bottom to facilitate easy insertion and extraction of cups of various configuration.

22. The universal holder as defined in claim 13 wherein the bottom surface of said holder is substantially flat to accept a strip of Velcro to be utilized for mounting said holder to a substantially horizontal surface.

23. A universal drink container holder of the top loading type for accommodating and safely supporting a drink container of any of a wide variety of sizes and configurations, comprising a vertical backbone member having a flat back portion, and a front portion having integrated thereon, a pair of curved arms functioning to securely clasp a drink container, said back portion of said backbone member having a strip of Velcro of a first type mounted thereon, a strip of Velcro of the second type being secured upon a generally vertical mounting surface, from which said holder is to be supported, said holder being firmly supported from the generally vertical mounting surface upon the two strips of Velcro being joined, and means at the top of the holder for preventing separation by peeling of the joined strips of Velcro, thus preventing removal of the holder from the vertical surface except as a result of a deliberate removal effort by the user.

24. The universal holder as recited in claim 23 in which said Velcro of the first type is hook type Velcro, and said Velcro of the second type is loop type Velcro.

25. The universal holder as recited in claim 23 in which said means for preventing separation of said Velcro strips is a mechanical means.

26. A universal holder of the top loading type for accommodating and safely supporting a drink container of any of a wide variety of sizes and configurations, comprising a vertical backbone member, said vertical backbone member supporting a pair of curved, highly flexible, symmetrically configured arms each possessing substantial curvature, and together forming a generally circular configuration, said arms having upper surfaces that are flared upwardly and outwardly to facilitate the downward insertion of a drink container therebetween, as well as helping provide strength to said arms such that they can clasp the drink container very securely, said arms being sufficiently flexible as to accommodate drink containers of many different diameters, and up to a diameter of approximately four inches, the cross-section of said arms gradually decreasing in the direction of the tips of the arms so that said arms possess a substantially smaller vertical dimension at their tips than adjacent the location of the attachment point of said arms to said vertical backbone member said vertical backbone member also supporting a circular, generally horizontally disposed base member at a location below said arms, said circular base member having an upturned flange, the bottoms of drink containers of a small size fitting inside said upturned flange, and the recessed bottoms of commercially available paper drink containers of a large size fitting around said flange, said circular base member in either instance cooperating with said arms to provide support and lateral stability for the drink container.

* * * * *